(12) United States Patent
Radamis

(10) Patent No.: US 6,932,367 B2
(45) Date of Patent: Aug. 23, 2005

(54) INTEGRATED MOTOR

(75) Inventor: Maged Radamis, Canton, MI (US)

(73) Assignee: Vistoen Global Technologies, Inc., Dearborn, MI (US)

( * ) Notice: Subject to any disclaimer, the term of this patent is extended or adjusted under 35 U.S.C. 154(b) by 19 days.

(21) Appl. No.: 10/272,410

(22) Filed: Oct. 16, 2002

(65) Prior Publication Data
US 2004/0075236 A1 Apr. 22, 2004

(51) Int. Cl.[7] .......................... B60G 9/04; B60G 11/26; B60G 17/02
(52) U.S. Cl. ........................ 280/124.158; 280/124.159; 280/124.16; 280/5.515
(58) Field of Search ................. 280/124.158, 124.159, 280/124.16, 124.161, 5.512, 5.515

(56) References Cited

U.S. PATENT DOCUMENTS

| | | |
|---|---|---|
| 1,983,896 A | 12/1934 | Böttcher |
| 2,451,990 A | 10/1948 | Sutherland |
| 2,749,459 A | 6/1956 | Williford, Jr. |
| 2,800,619 A | 7/1957 | Brunt |
| 3,407,680 A | 10/1968 | Westmoreland |
| 3,693,034 A | 9/1972 | Inariba |
| 3,950,686 A | 4/1976 | Randall |
| 4,785,213 A | 11/1988 | Satake |
| 4,945,296 A | 7/1990 | Satake |
| 5,068,559 A | 11/1991 | Satake et al. |
| 5,172,784 A | 12/1992 | Varela, Jr. |
| 5,457,363 A * | 10/1995 | Yoshii et al. ................ 318/432 |
| 5,528,094 A | 6/1996 | Hasebe et al. |
| 5,677,581 A * | 10/1997 | Yoshida et al. ............ 310/49 R |
| 5,677,582 A | 10/1997 | Lutz et al. |
| 5,682,980 A * | 11/1997 | Reybrouck ............. 280/124.16 |
| 5,855,379 A * | 1/1999 | Buma et al. ........... 280/124.158 |
| 5,917,248 A | 6/1999 | Seguchi et al. |
| 5,994,811 A | 11/1999 | Thomassen |
| 5,998,901 A | 12/1999 | Kawabata et al. |
| 6,276,189 B1 * | 8/2001 | Hurson ............................. 73/9 |
| 6,278,211 B1 | 8/2001 | Sweo |
| 6,376,955 B1 | 4/2002 | Arimitsu |
| 6,462,430 B1 | 10/2002 | Joong et al. |
| 6,664,680 B1 * | 12/2003 | Gabrys ......................... 310/74 |
| 6,711,935 B2 * | 3/2004 | Hurson ............................. 73/9 |
| 6,814,364 B2 * | 11/2004 | Coombs et al. ........ 280/124.158 |
| 2001/0020805 A1 | 9/2001 | Nakano et al. |
| 2002/0117933 A1 | 8/2002 | Joong et al. |
| 2002/0124629 A1 * | 9/2002 | Hurson ............................. 73/9 |
| 2002/0153792 A1 | 10/2002 | Isozaki et al. |
| 2002/0195789 A1 * | 12/2002 | Coombs et al. ......... 280/124.16 |
| 2003/0001353 A1 * | 1/2003 | Coombs et al. ......... 280/124.16 |
| 2003/0102646 A1 * | 6/2003 | Gloceri et al. ........ 280/124.161 |
| 2003/0168828 A1 * | 9/2003 | Coombs et al. ....... 280/124.154 |
| 2004/0183042 A1 * | 9/2004 | Invernizzi .............. 251/129.08 |

FOREIGN PATENT DOCUMENTS

WO WO-02/45982 A1 * 6/2002 ............ B60G/7/00

* cited by examiner

Primary Examiner—Paul N. Dickson
Assistant Examiner—Joselynn Y. Sliteris
(74) Attorney, Agent, or Firm—Brinnks Hofer Gilson & Lione

(57) ABSTRACT

A device for converting electrical energy to mechanical energy is disclosed and claimed. The device includes a housing, a shaft, at least two coil assemblies, at least two magnets, and at least two electrical connectors. The shaft is supported by the housing and rotatable therein. The at least two coil assemblies are mounted to one of the housing and the shaft. The at least two magnets are mounted to the other of the housing and the shaft. The at least two electrical connectors are in communication with the at least two coil assemblies, wherein each of the at least two electrical connectors provide electrical energy to each of the at least two coil assemblies independently to generate a magnetic field in same, wherein the magnetic field interacts with the at least two magnets to produce an output torque on the shaft.

10 Claims, 7 Drawing Sheets

INTEGRATED MOTOR

TECHNICAL FIELD

The subject matter of this invention generally relates to electric machines used in a vehicle and, more particularly, to electric machines for generating mechanical energy to power various vehicle systems.

BACKGROUND

Conventional automotive electrical systems are typically 12 volt DC systems that limit each power feed to any vehicle system (i.e. a vehicle suspension system) to 1 kilowatt. Each 1 kilowatt power feed provides an 80 amp current source. This electrical supply arrangement is sufficient for systems that only require the torque output generated by a 1 kilowatt motor, however vehicle systems requiring a higher torque output would require a more complex and expensive power supply arrangement.

Thus, there is a need for a less complex and less costly device for supplying the required power. The device should accept separate and independent electrical power feeds of 1 kilowatt of power per feed. Thus, accommodating the 80 amp per feed found in conventional automotive electrical systems.

DETAILED DESCRIPTION

The following description of the preferred embodiment of the invention is not intended to limit the invention to the preferred embodiment, but rather to enable any person skilled in the art of suspension systems to use this invention.

Figure 1:
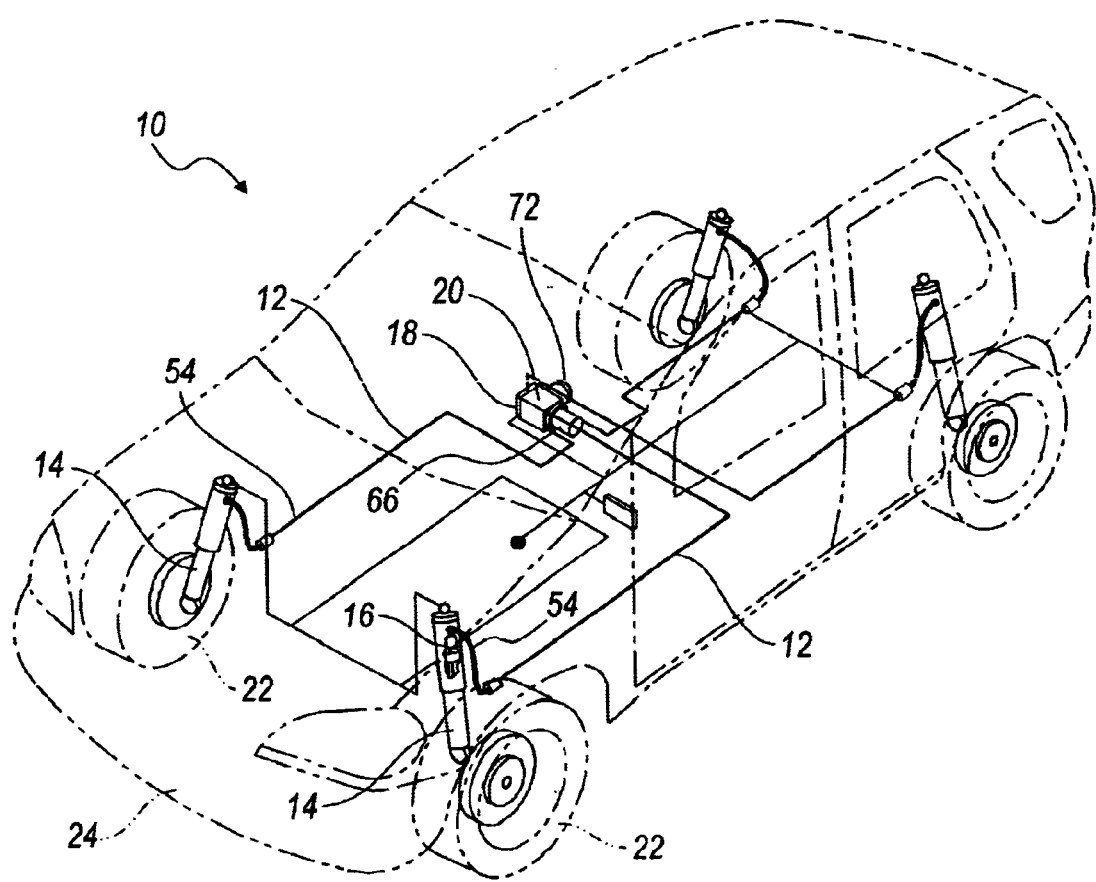
FIG. 1 is a cut away perspective view of the suspension system of the preferred embodiment, shown within a vehicle.

As shown in FIG. 1, the suspension system 10 of the preferred embodiment includes a compressible fluid 12, a suspension strut 14, a hydraulic cavity 16, a reservoir 18, and a volume modulator 20. The hydraulic cavity 16, which is at least partially defined by the suspension strut 14, contains a portion of the compressible fluid 12 and cooperates with the compressible fluid 12 to supply a suspending spring force. The suspending spring force biases a wheel 22 of the vehicle 24 toward the surface. The volume modulator 20, which is coupled to the hydraulic cavity 16 and to the reservoir 18, selectively pushes the compressible fluid 12 from the reservoir 18 into the hydraulic cavity 16 and vents the compressible fluid 12 from the hydraulic cavity 16 into the reservoir 18, thereby actively modulating the suspending spring force. By increasing the suspending spring force in the suspension struts 14 of the outside wheels during a turn, the vehicle 24 can better resist roll. By decreasing the suspending spring force over rough surfaces, the vehicle 24 can better isolate the passengers. Thus, by actively modulating the suspending spring force, the vehicle 24 can maximize both ride and handling and avoid the inherent compromise of conventional suspension systems.

Figure 2:
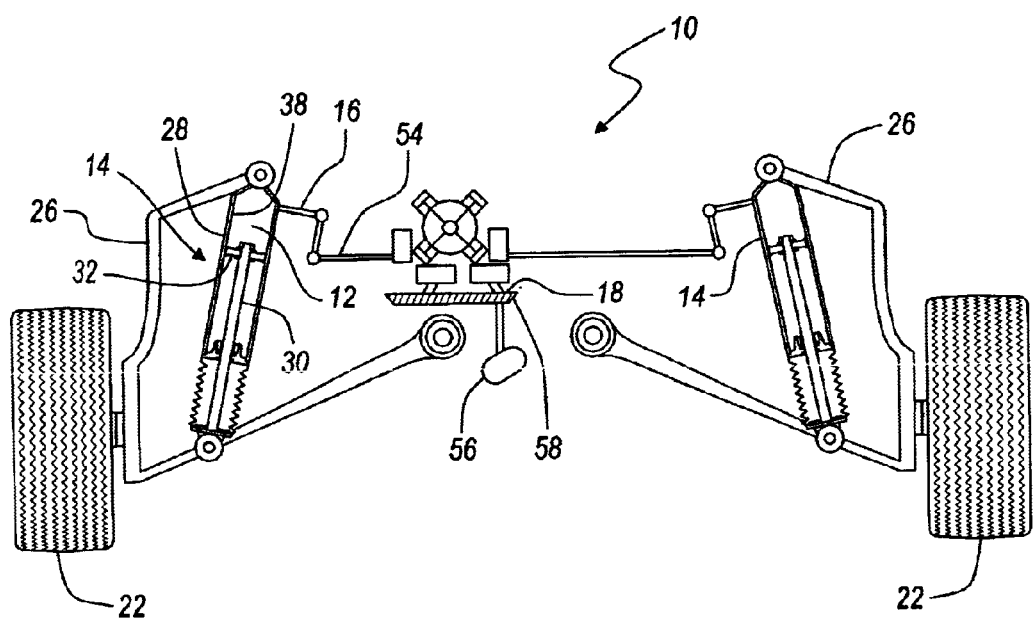
FIG. 2 is a schematic view of the suspension system of FIG. 1.

As shown in FIGS. 1 and 2, the suspension system 10 of the preferred embodiment has been specifically designed for a vehicle 24 having four wheels 22 and four suspension links 26 (two shown in FIG. 2) suspending the individual wheels 22 from the vehicle 24. The suspension links 26 allow compression movement of the individual wheels 22 toward the vehicle 24 and rebound movement of the individual wheels toward the road surface. Despite this design for a particular environment, the suspension system 10 may be used in any suitable environment, such as other vehicles with more or less wheels.

The compressible fluid 12 of the preferred embodiment, which cooperates to supply the suspending spring force, is preferably a silicon fluid that compresses about 1.5% volume at 2,000 psi, about 3% volume at 5,000 psi, and about 6% volume at 10,000 psi. Above 2,000 psi, the compressible fluid has a larger compressibility than conventional hydraulic oil. The compressible fluid, however, may alternatively be any suitable fluid, with or without a silicon component, that provides a larger compressibility above 2,000 psi than conventional hydraulic oil.

Figure 3:
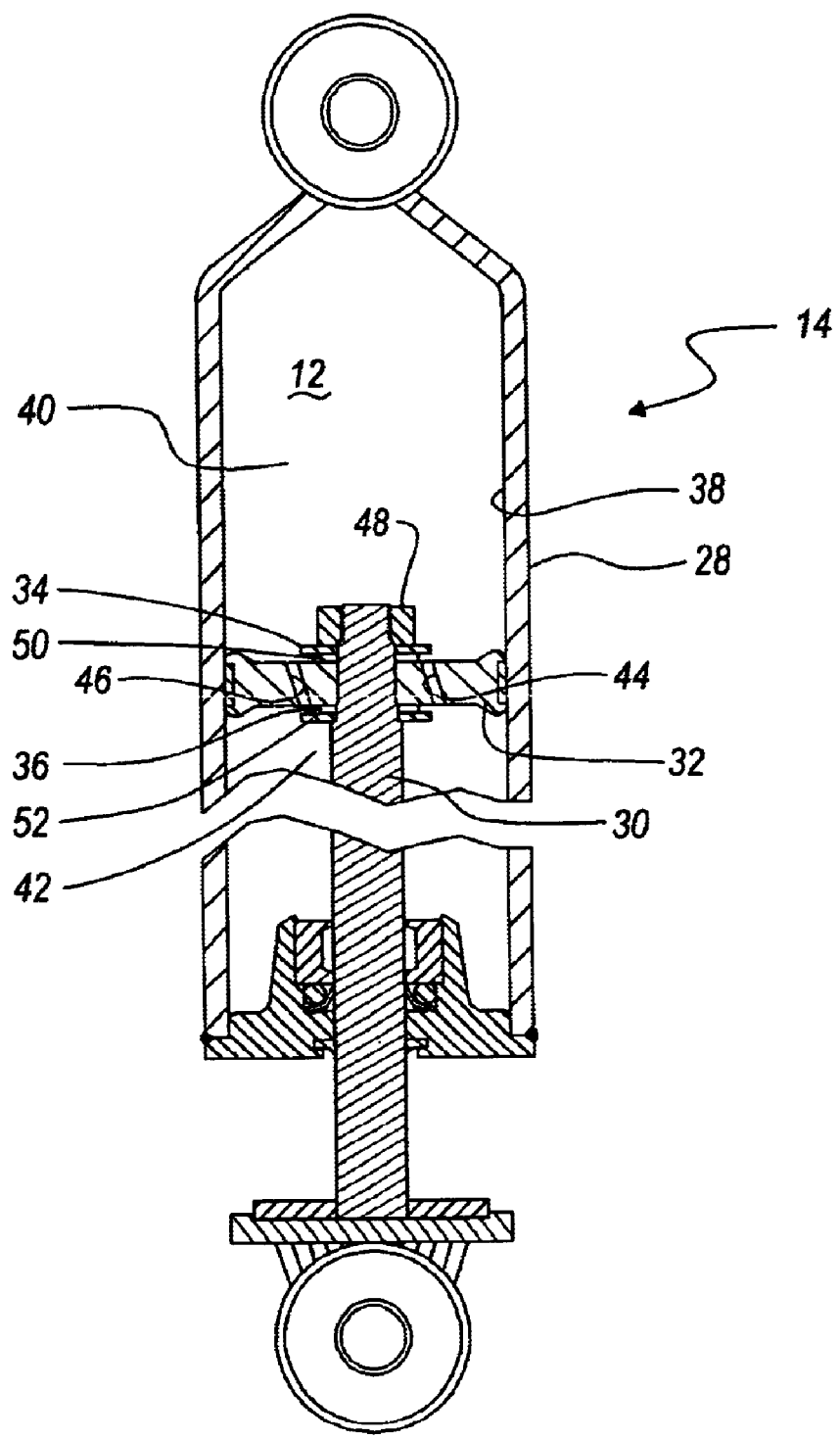
FIG. 3 is a cross-sectional view of a suspension strut of the suspension system of FIG. 1.

As shown in FIGS. 2 and 3, the suspension strut 14 of the preferred embodiment includes a hydraulic tube 28, a displacement rod 30, a cavity piston 32, a first variable restrictor 34, and a second variable restrictor 36. The hydraulic tube 28 and displacement rod 30 of the preferred embodiment cooperatively function to couple the suspension link and the vehicle and to allow compression movement of the wheel 22 toward the vehicle and rebound movement of the wheel 22 toward the road surface. The hydraulic tube 28 preferably defines an inner cavity 38, which functions to contain a portion of the compressible fluid 12. As previously mentioned, the inner cavity 38 and the compressible fluid 12 preferably cooperate to supply the suspending spring force that biases the wheel 22 toward the surface and, essentially, suspend the entire vehicle above the surface. The displacement rod 30 is adapted to move into the inner cavity 38 upon the compression movement of the wheel 22 and to move out of the inner cavity 38 upon the rebound movement of the wheel 22. As it moves into the inner cavity 38, the displacement rod 30 displaces, and thereby compresses, the compressible fluid 12. In this manner, the movement of the displacement rod 30 into the inner cavity 38 increases the suspending spring force of the suspension strut 14. As the displacement rod 30 moves out of the inner cavity 38, the compressible fluid 12 decompresses and the suspending spring force of the suspension strut 14 decreases. The displacement rod 30 is preferably cylindrically shaped and, because of this preference, the displacement of the displacement rod 30 within the inner cavity 38 and the magnitude of the suspending spring force have a linear relationship. If a linear relationship is not preferred for the particular application of the suspension strut 14, or if there is any other appropriate reason, the displacement rod 30 may be alternatively designed with another suitable shape. The hydraulic tube 28 and the displacement rod 30 are preferably made from conventional steel and with conventional methods, but may alternatively be made from any suitable material and with any suitable method.

The cavity piston 32 of the preferred embodiment is preferably coupled to the displacement rod 30 and preferably extends to the hydraulic tube 28. In this manner, the cavity piston 32 separates the inner cavity 38 into a first section 40 and a second section 42. The cavity piston 32 defines a first orifice 44 and a second orifice 46, which both preferably extend between the first section 40 and the second section 42 of the inner cavity 38. The first orifice 44 and the second orifice 46 function to allow flow of the compressible fluid 12 between the first section 40 and the second section 42 of the inner cavity 38. The cavity piston 32 is preferably securely mounted to the displacement rod 30 by a conventional fastener 48, but may alternatively be integrally formed with the displacement rod 30 or securely mounted with any suitable device. The cavity piston 32 is preferably made from conventional materials and with conventional methods, but may alternatively be made from other suitable materials and with other suitable methods.

The first variable restrictor 34 of the preferred embodiment is coupled to the cavity piston 32 near the first orifice 44. The first variable restrictor 34 functions to restrict the passage of the compressible fluid 12 through the first orifice 44 and, more specifically, functions to variably restrict the passage based on the velocity of the cavity piston 32 relative to the hydraulic tube 28. In the first preferred embodiment, the first variable restrictor 34 is a first shim stack 50 preferably made from conventional materials and with conventional methods. In alternative embodiments, the first variable restrictor 34 may include any other suitable device able to variably restrict the passage of the compressible fluid 12 through the first orifice 44 based on the velocity of the cavity piston 32 relative to the hydraulic tube 28. The second variable restrictor 36 of the preferred embodiment is coupled to the cavity piston 32 near the second orifice 46. The second variable restrictor 36—like the first variable restrictor 34—functions to restrict the passage of the compressible fluid 12 through the second orifice 46 and, more specifically, functions to variably restrict the passage based on the velocity of the cavity piston 32 relative to the hydraulic tube 28. In the preferred embodiment, the second variable restrictor 36 is a second shim stack 52 preferably made from conventional materials and with conventional methods. In alternative embodiments, the second variable restrictor 36 may include any suitable device able to variably restrict a passage of the compressible fluid 12 through the second orifice 46 based on the velocity of the cavity piston 32 relative to the hydraulic tube 28.

The cavity piston 32, the first orifice 44, and the first variable restrictor 34 of the preferred embodiment cooperate to supply the rebound damping force during the rebound movement of the wheel 22. The rebound damping force acts to dampen the suspending spring force that tends to push the displacement rod 30 out of the hydraulic tube 28. The cavity piston 32, the second orifice 46, and a second variable restrictor 36, on the other hand, cooperate to supply the compression damping force during the compression movement of the wheel 22. The compression damping force acts to dampen any impact force that tends to push the displacement rod 30 into the hydraulic tube 28.

The suspension strut 14 of the preferred embodiment is further described in U.S. application filed on 07 Dec. 2001, entitled "Compressible Fluid Strut", and assigned to Visteon Global Technologies, Inc. As described in that application, the suspension strut may include a pressure vessel and may include a valve. In alternative embodiments, the suspension strut may include any suitable device to allow active modulation of the suspending spring force with compressible fluid.

As shown in FIG. 1, the suspension system 10 of the preferred embodiment also includes hydraulic lines 54 adapted to communicate the compressible fluid 12 between the individual suspension struts 14 and the volume modulator 20. Together with the inner cavity 38 of the individual suspension struts 14, the hydraulic lines 54 define individual hydraulic cavities 16. Preferably, the compressible fluid 12 flows freely between the volume modulator 20 and the inner cavity 38 of the individual suspension struts 14. Alternatively, the hydraulic cavities 16 may include one or more controllable valves such that the hydraulic cavity 16 is entirely defined by the suspension strut 14 or by the suspension strut 14 and a portion of the hydraulic line 54.

As shown in FIG. 2, the reservoir 18 functions to contain a portion of the compressible fluid 12 that has been vented from the hydraulic cavity 16 and that may eventually be pushed into the hydraulic cavity 16. The reservoir 18 is preferably made from conventional materials and with conventional methods, but may alternatively be made from any suitable material and with any suitable method. The suspension system 10 of the preferred embodiment includes a pump 56 adapted to pressurize the compressible fluid 12 within the reservoir 18. In this manner, the reservoir 18 acts as an accumulator 58. By using compressible fluid 12 under a pressure of about 1500 psi within the reservoir 18, the volume modulator 20 consumes less energy to reach a particular pressure within an individual hydraulic cavity 16. In an alternative embodiment, the compressible fluid 12 within the reservoir 18 may be at atmospheric pressure or may be vented to the atmosphere.

As shown in FIG. 2, the volume modulator 20 is coupled to the hydraulic line 54 and to the reservoir 18. The volume modulator 20, as previously mentioned, functions to selectively push the compressible fluid 12 into the hydraulic cavity 16 and to vent the compressible fluid 12 from the hydraulic cavity 16. In the preferred embodiment, the volume modulator 20 is a digital displacement pump/motor as described in U.S. Pat. No. 5,259,738 entitled "Fluid-Working Machine" and issued to Salter et al. on 09, Nov. 1993, which is incorporated in its entirety by this reference. In alternative embodiments, the volume modulator 20 may be any suitable device that selectively pushes the compressible fluid 12 into the hydraulic cavity 16 and vents the compressible fluid 12 from the hydraulic cavity 16 at a sufficient rate to actively modulate the suspending spring force.

Figure 4:
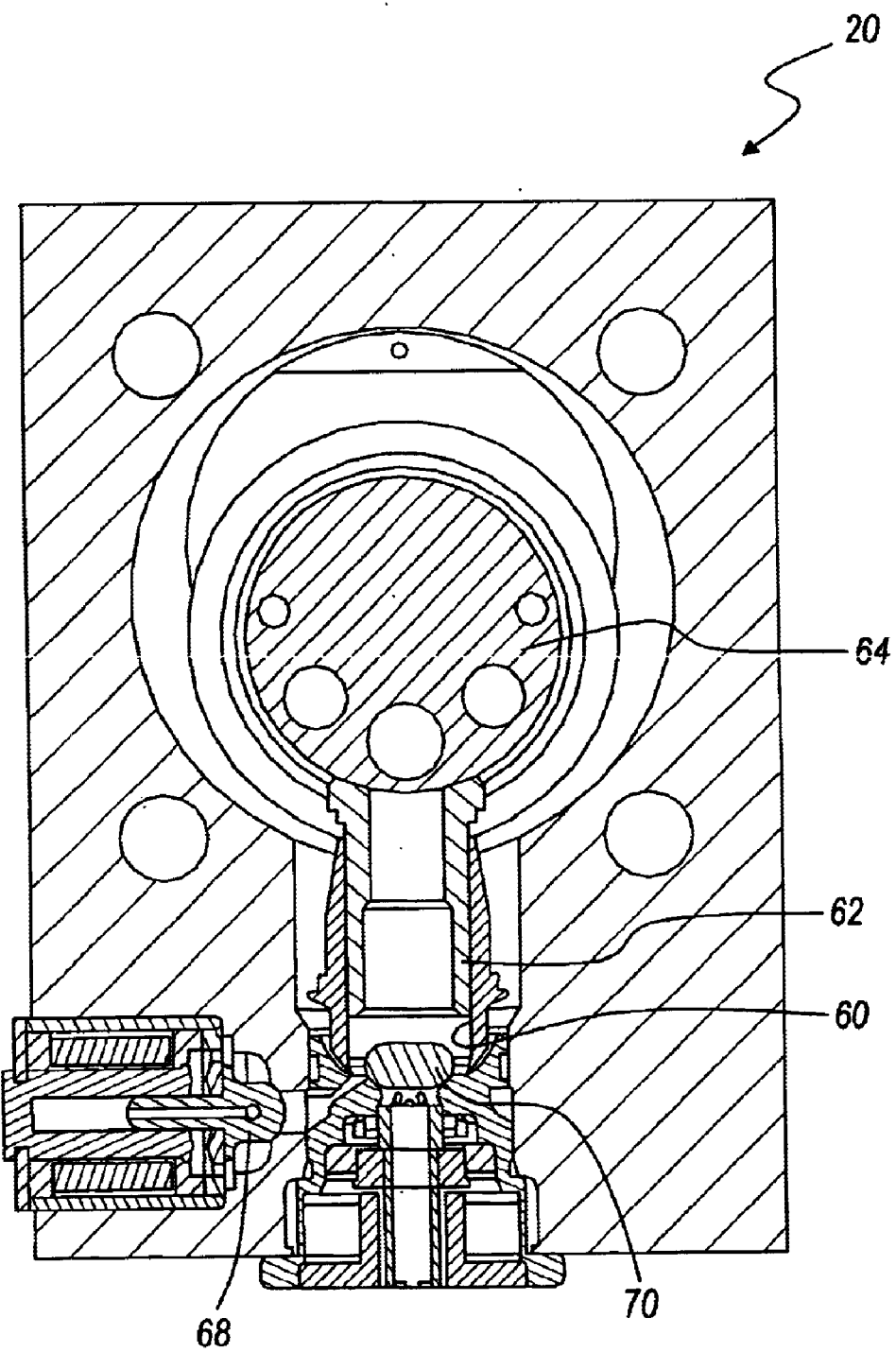
FIG. 4 is a detailed view of the volume modulator of the suspension system of FIG. 1.

As shown in FIG. 4, the volume modulator 20 of the preferred embodiment defines a modulator cavity 60 and includes a modulator piston 62 adapted to continuously cycle through a compression stroke and an expansion stroke within the modulator cavity 60. The modulator piston 62 is preferably connected to an eccentric 64 that is rotated by a motor 66 (shown in FIG. 1). Because of the "active" nature of the modulation of the suspending spring force, the modulator piston 62 cycles through the compression stroke and expansion stroke at a relatively high frequency (up to 30 Hz) and, thus, the motor preferably rotates at a relatively high rotational velocity (up to 2000 rpm).

The volume modulator 20 of the preferred embodiment also includes a cavity-side valve 68 coupled between the hydraulic line and the volume modulator 20 and a reservoir-side valve 70 coupled between the reservoir and the volume modulator 20. The cavity-side valve 68 and the reservoir-side valve 70 function to selectively restrict the passage of the compressible fluid. Preferably, the cavity-side valve 68 and the reservoir-side valve 70 are so-called poppet valves that may be actuated at relatively high frequencies. Alternatively, the cavity-side valve 68 and the reservoir-side valve 70 may be any suitable device that selectively restricts the passage of the compressible fluid at an adequate frequency.

Figure 5A:
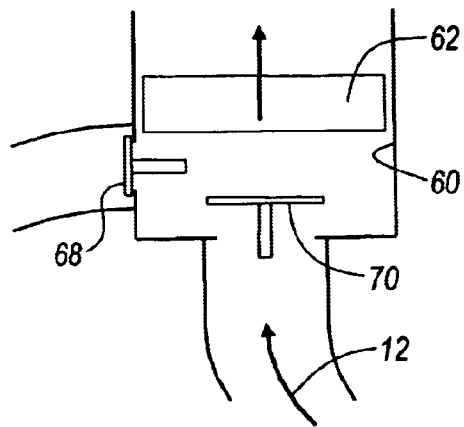
FIGS. 5A, 5B, 6A, and 6B are schematic views of the different stages of the volume modulator of FIG. 4.
Figure 5B:
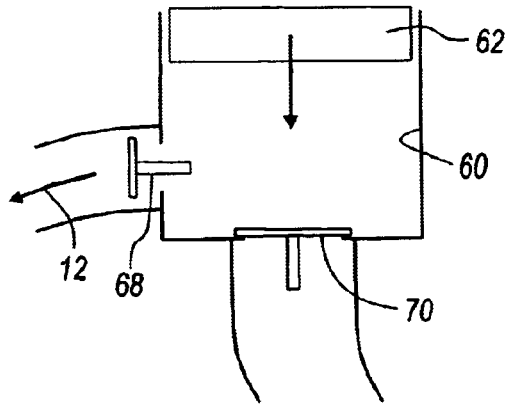

As shown in FIGS. 5A and 5B, the cavity-side valve 68, the reservoir-side valve 70, and the modulator piston 62 can cooperate to draw compressible fluid 12 from the reservoir and push the compressible fluid 12 into the hydraulic cavity. In the first stage, as shown in FIG. 5A, the cavity-side valve 68 is closed and the reservoir-side valve 70 is opened, while the modulator piston 62 increases the volume in the modulator cavity 60 (the expansion stroke). The expansion stroke of the modulator piston 62 draws the compressible fluid 12 into the modulator cavity 60. During the second stage, as shown in FIG. 5B, the reservoir-side valve 70 is closed and the cavity-side valve 68 is opened, while the modulator piston 62 decreases the volume in the modulator cavity 60 (the compression stroke). The compression stroke of the modulator piston 62 pushes the compressible fluid 12 into the hydraulic cavity, which increases the suspending spring force at that particular suspension strut and wheel.

Figure 6A:
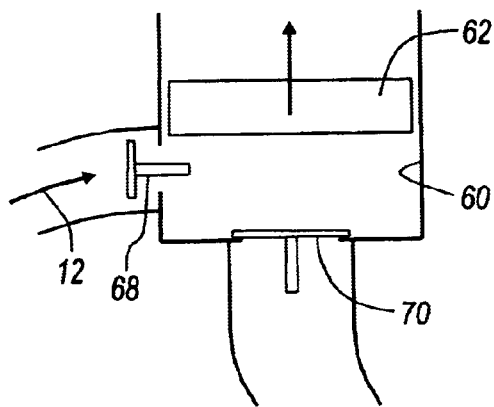
Figure 6B:
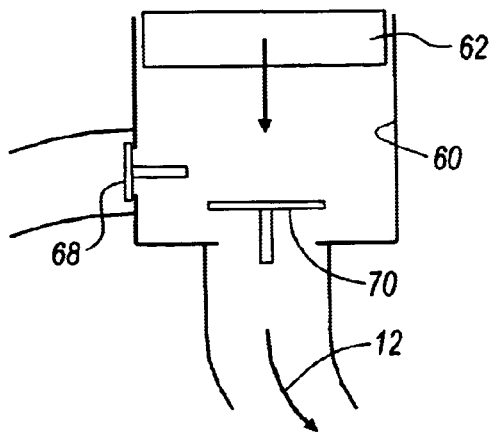

As shown in FIGS. 6A and 6B, the cavity-side valve 68, the reservoir-side valve 70, and the modulator piston 62 can also cooperate to draw compressible fluid 12 from the hydraulic cavity and vent the compressible fluid 12 into the reservoir. In the first stage, as shown in FIG. 6A, the cavity-side valve 68 is opened and the reservoir-side valve 70 is closed, while the modulator piston 62 increases the volume in the modulator cavity 60 and draws the compressible fluid 12 into the modulator cavity 60. During the second stage, as shown in FIG. 6B, the reservoir-side valve 70 is opened and the cavity-side valve 68 is closed, while the modulator piston 62 decreases the volume in the modulator cavity 60 and vents the compressible fluid 12 into the reservoir, which decreases the suspending spring force at that particular suspension strut and wheel.

During the operation of the vehicle, it may be advantageous to neither increase nor decrease the suspending spring force. Since the motor 66, the eccentric 64, and the modulator pistons 62 are continuously moving, the reservoir-side valve 70 and the volume modulator 20 can also cooperate to draw compressible fluid 12 from the reservoir (shown in FIG. 5A) and vent the compressible fluid 12 back into the reservoir (shown in FIG. 6B). This process does not modulate the pressure of the hydraulic cavity 16 and does not increase or decrease the suspending spring force.

Although FIGS. 5A, 5B, 6A, and 6B show only one modulator cavity 60 and modulator piston 62, the volume modulator 20 preferably includes a modulator cavity 60, a modulator piston 62, a cavity-side valve 68, and a reservoir-side valve 70 for each suspension strut 14 on the vehicle 24. Preferably, the motor 66 and the eccentric 64 drive the multiple modulator pistons 62, but the individual modulator pistons 62 may alternatively be driven by individual motors and individual eccentrics. Further, a control unit 72 (shown in FIG. 1) may individually control the cavity-side valve 68 and reservoir-side valve 70 corresponding to a particular suspension strut 14 and wheel 22 to adjust the ride and handling of the vehicle 24 on a wheel-to-wheel basis. The control unit 72 may also be used to adjust particular suspension struts 14 on a side-by-side basis of the vehicle 24 to adjust the roll or the pitch of the vehicle 24. The control unit 72 may further be used to adjust all of the suspension struts 14 to adjust the ride height of the vehicle 24. The control unit 72 is preferably made from conventional material and with conventional methods, but may alternatively be made from any suitable material and with any suitable method.

Figure 7:
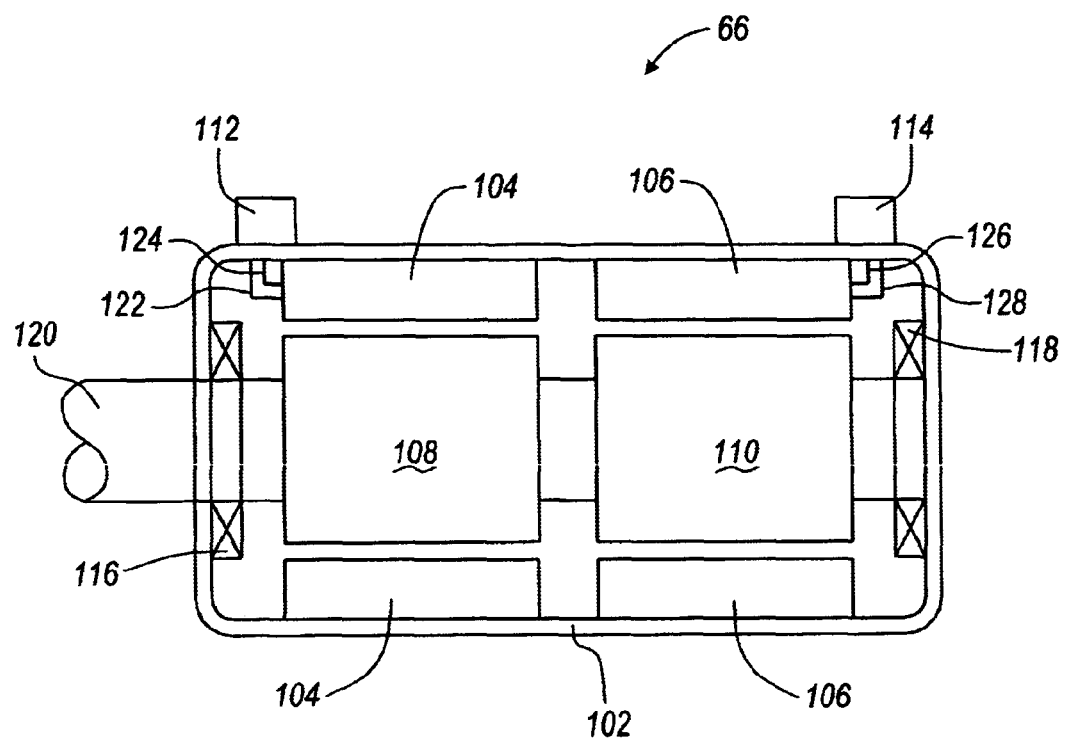
FIG. 7 is a schematic diagram of a brushless motor, in accordance with the present invention.
Figure 8:
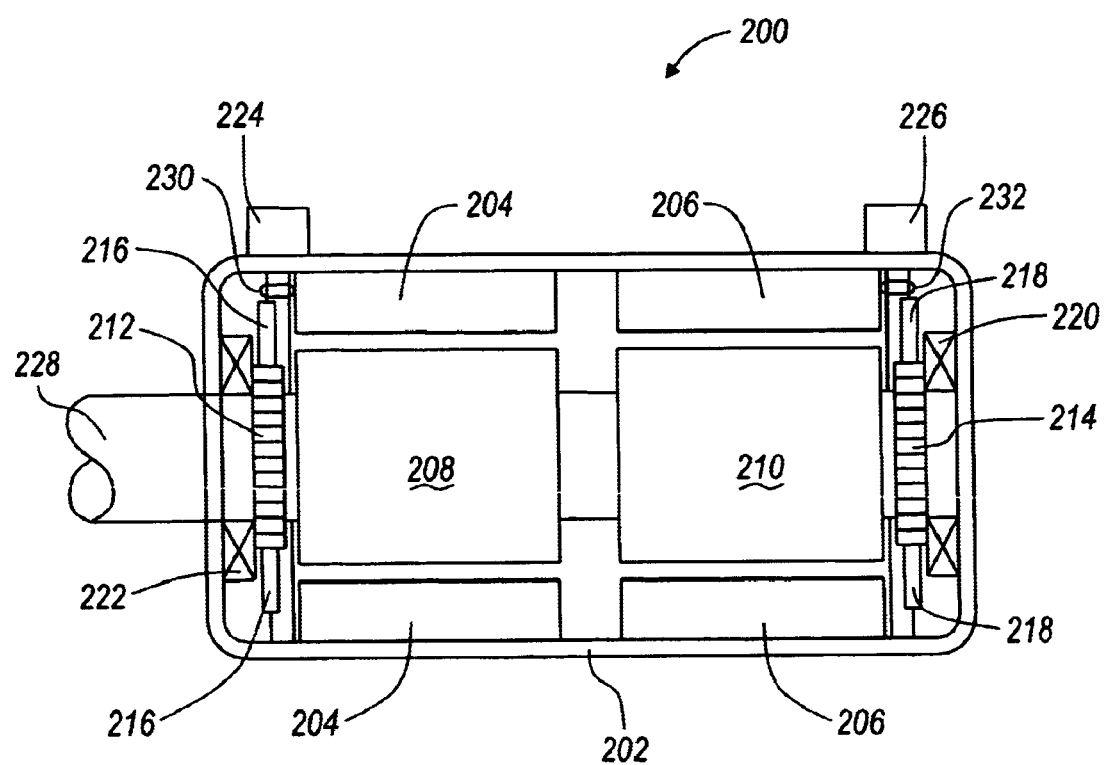
FIG. 8 is a schematic diagram of a brushed motor, in accordance with the present invention.

Referring now to FIG. 7, a cross-sectional view of motor 66 is illustrated, in accordance with the present invention. Motor 66 is a brushless motor, however the present invention contemplates using a brushed motor, as shown in FIG. 8). Motor 66 includes a housing 102, a first coil assembly 104, a second coil assembly 106, a first permanent magnet 108, a second permanent magnet 110, a first electrical connector 112, a second electrical connector 114, a pair of bearings 116 and 118 and a rotatable shaft 120. First coil 104 and second coil assembly 106 are mounted next to each other on housing 102. Coil assemblies 104 and 106 are typical electric motor coil assemblies having many windings for carrying electrical current and generating a magnetic field. Permanent magnets 108 and 110 are fixedly mounted on shaft 120 for rotatable movement with shaft 120. Bearings 116 and 118 are mounted to housing 102 and are coupled to shaft 120 allowing shaft 120 and permanent magnets 108 and 110 to rotate within housing 102. Electrical connectors 112 and 114 are independently connected to a vehicle power supply (not shown). Typically, the vehicle power supply is a 12 volt supply (including a 12 volt battery), which is capable of supplying up to 80 amps per power feed. More specifically, a pair of start and end leads 122 and 124 from first coil assembly 104, and end leads 126 and 128 from second coil assembly 106 connect to connector pins (not shown), in a conventional manner, within first connector 112 and second connector 114. Thus, a full 80 amps of current may be independently drawn by first coil assembly 104 and second coil assembly 106 to generate a magnetic field in same, wherein the magnetic field interacts with the magnets to produce an output torque on the shaft.

In an alternate embodiment of the present invention, a brushed motor 200 is substituted for motor 66. Motor 200 is illustrated in cross-sectional view in FIG. 8, in accordance with the present invention. Motor 200 includes a housing 202, permanent magnets 204 and 206, coil assemblies 208 and 210, commutators 212 and 214, brushes 216 and 218, bearing 220 and 222, electrical connectors 224 and 226, and shaft 228.

Permanent magnets 24 and 206 are preferably ring magnets that are fixedly mounted to housing 202. Coil assemblies 208 and 210 are conventional coil assemblies found in conventional electric machines and on shaft 228 for rotation therewith. Further, coil assemblies 208 and 210 generally many windings of magnet wire and are axially aligned with permanent magnets 204 and 206. Shaft 228 is supported for rotatable movement within housing 202 by bearings 220 and 222.

Electrical energy is communicated to coil assemblies 208 and 210 through brushes 216 and 218. A pair of power supply lines 230 and 232 communicate electrical energy from connectors 224 and 226 to brushes 216 and 218. More specifically, brushes 216 and 218 intermittently provide direct current electrical energy to commutators 212 and 214. The electrical energy is supplied by a 12 volt supply providing a maximum of 80 amps, and connected to connector 224 and separately to connector 226. The commutators are electrically connected to the start and end leads of coil assemblies 208 and 210. Thus, in a conventional manner as coil assemblies 208 and 210 rotate with shaft 228 commutators 212 and 214 intermittently contact brushes 216 and 218 passing electricity intermittently to coil assemblies 208 and 210.

The present invention has many advantages and benefits over the prior art. For example, an electric motor (motor 66 or 200) is provided that accepts multiple and independent power feeds (1 kilowatt) which may be independently controlled. Since motor 66, 200 includes multiple independent power connections that are in communication with a plurality of electrically isolated coils (such as coil assemblies 104, 106, 204 and 206), systems requiring additional rotational power (torque) may be accommodated by independently controlling the power feeds to motor 66. As power is supplied to each connector of motor 66, the respective coil assemblies are energized and an output torque is produced on shaft 120 or 228. The output torque will be the sum of the torques produced by the independently controlled coil and magnetic assemblies. Generally as current increase so to will the output torque on shaft 120 or 228.

In an alternate embodiment of the present invention, motor 66 may be connected to a single power source in applications that do not require additional power (less than 1 kilowatt), but do require a high degree of reliability (failsafe). Thus, if a failure occurs in one of the coil/magnet assemblies, the motor will still be able to supply some power at a reduced rate.

The present invention further contemplate that multiple devices may be rotatably fixed to shaft 120 or shaft 228. For example, modulator 20 may be coupled to shaft 120 or 228 to receive the required rotational torque necessary to operate modulator 20. Other systems, and/or components thereof may be fixedly and rotatably secured to shafts 120 or 228 such as door/window, seat adjusters, steering, etc. to receive the required rotational torque to operate.

As any person skilled in the art will recognize from the previous detailed description and from the figures and claims, modifications and changes can be made to the preferred embodiment of the invention without departing from the scope of this invention defined in the following claims.

I claim:

1. A suspension system for a vehicle having a wheel contacting a surface under the vehicle and a suspension link suspending the wheel from the vehicle and allowing relative movement of the wheel and the vehicle, said suspension system comprising:
    a compressible fluid;
    a suspension strut adapted to couple the suspension link and the vehicle;
    a hydraulic cavity at least partially defined by said suspension strut and adapted to contain a portion of said compressible fluid and to cooperate with said compressible fluid to supply a suspending spring force that biases the wheel toward the surface;
    a reservoir adapted to contain a portion of said compressible fluid; and
    a volume modulator coupled to said hydraulic cavity and said reservoir and adapted to selectively push said compressible fluid into said hydraulic cavity and vent said compressible fluid from said hydraulic cavity, thereby actively modulating said suspending spring force, wherein said volume modulator defines a modulator cavity and includes a modulator piston adapted to cycle through a compression stroke and an expansion stroke within said modulator cavity, a cavity-side valve coupled between said hydraulic cavity and said volume modulator and adapted to selectively restrict the passage of said compressible fluid between said hydraulic cavity and said modulator cavity, and a reservoir-side valve coupled between said reservoir and said volume modulator and adapted to selectively restrict the passage of said compressible fluid between said reservoir and said modulator cavity; and
    a motor coupled to the volume modulator to provide power to move the modulator piston through the compression stroke and the expansion stroke, the motor including:
    a housing;
    a shaft supported by the housing and rotatable therein;
    at least two coil assemblies mounted to one of the housing and the shaft;
    at least two magnets mounted to the other of the housing and the shaft; and
    at least two electrical connectors in communication with the at least two coil assemblies, wherein each of the at least electrical connectors provide electrical energy to each of the at least two coil assemblies independently.

2. The suspension system of claim 1 wherein said suspension strut includes a displacement rod adapted to move into said hydraulic cavity and to compress said compressible fluid upon the relative movement of the wheel and the vehicle.

3. The suspension system of claim 2 wherein said displacement rod includes a cavity piston adapted to supply a damping force.

4. The suspension system of claim 1 wherein said hydraulic cavity is defined by said suspension strut and a hydraulic line adapted to communicate said compressible fluid between said suspension strut and said volume modulator.

5. The suspension system of claim 1 wherein said compressible fluid includes a silicone fluid.

6. The suspension system of claim 1 wherein said compressible fluid has a larger compressibility above 2,000 psi than hydraulic oil.

7. The suspension system of claim 1 wherein said compressible fluid is adapted to compress about 1.5% volume at 2,000 psi, about 3% volume at 5,000 psi, and about 6% volume at 10,000 psi.

8. The suspension system of claim 1 further comprising an electric control unit coupled to said volume modulator and adapted to close said cavity-side valve and open said reservoir-side valve during said expansion stroke and to open said cavity-side valve and close said reservoir-side valve during said compression stroke, thereby pushing said compressible fluid into said hydraulic cavity.

9. The suspension system of claim 8 wherein said electronic control unit is further adapted to open said cavity-side valve and close said reservoir-side valve during said expansion stroke and to close said cavity-side valve and open said reservoir-side valve during said compression stroke, thereby venting said compressible fluid from said hydraulic cavity.

10. The suspension system of claim 1 further comprising a pump adapted to pressurize said compressible fluid within said reservoir.

* * * * *